May 8, 1923.  1,454,231
M. F. GEER
BRAKE CONTROLLING MECHANISM FOR AUTOMATIC TRAIN CONTROL SYSTEMS
Filed Dec. 27, 1919  3 Sheets-Sheet 2
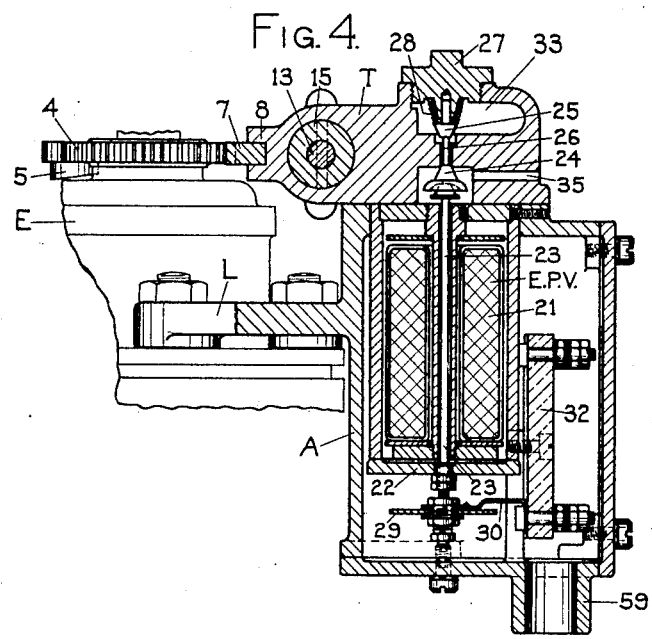
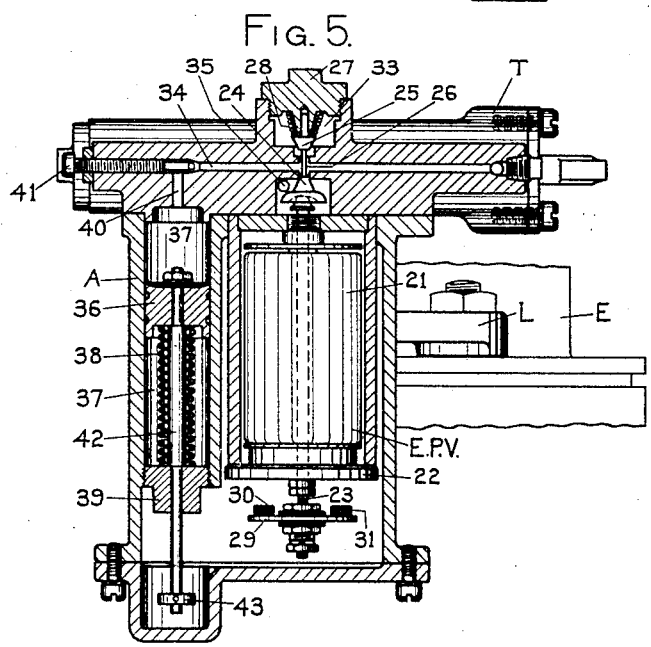
INVENTOR.
Maurice F. Geer,
BY Neil D. Preston,
his ATTORNEY.

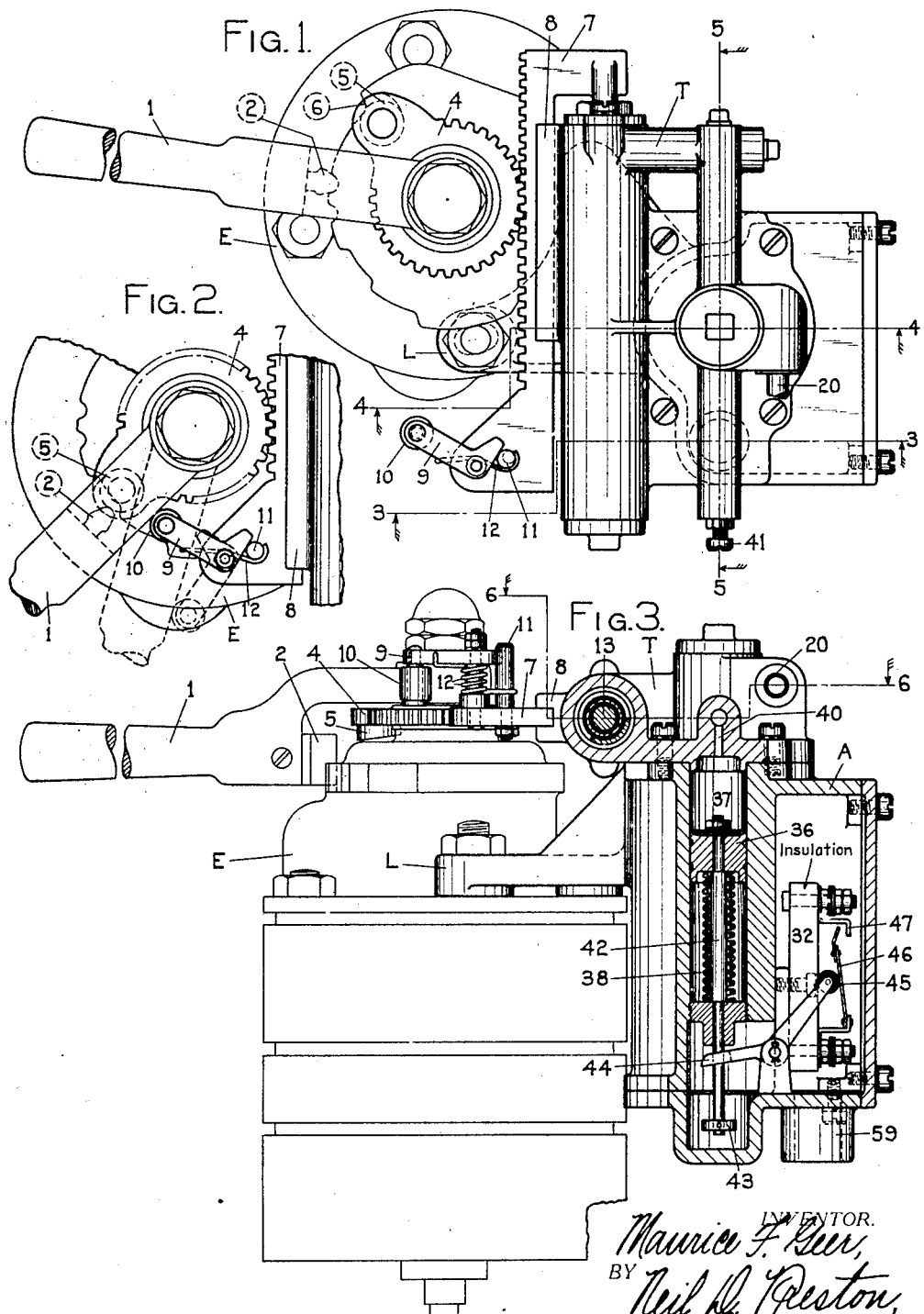

May 8, 1923. 1,454,231

M. F. GEER

BRAKE CONTROLLING MECHANISM FOR AUTOMATIC TRAIN CONTROL SYSTEMS

Filed Dec. 27, 1919 3 Sheets-Sheet 3

INVENTOR.
Maurice F. Geer,
BY Neil D. Preston,
his ATTORNEY.

Patented May 8, 1923.

1,454,231

UNITED STATES PATENT OFFICE.

MAURICE F. GEER, OF IRONDEQUOIT, NEW YORK, ASSIGNOR TO GENERAL RAILWAY SIGNAL COMPANY, OF ROCHESTER, NEW YORK, A CORPORATION OF NEW YORK.

BRAKE-CONTROLLING MECHANISM FOR AUTOMATIC TRAIN-CONTROL SYSTEMS.

Application filed December 27, 1919. Serial No. 347,683.

*To all whom it may concern:*

Be it known that I, MAURICE F. GEER, a citizen of the United States, and resident of the town of Irondequoit, in the county of Monroe and State of New York, have invented a new and useful Brake-Controlling Mechanism for Automatic Train-Control Systems, of which the following is a specification.

This invention relates to automatic train control systems, and more particularly to an electrically controlled pneumatic device for operating the usual engineer's brake valve to produce an automatic brake application.

In one type of train control system to which my invention is more particularly applicable, it is proposed to exert an automatic control on the car or train at each caution signal, or other appropriate control point, which tends to apply the brakes; but provision is made so that the engineer may prevent such brake application, if the speed of the train or other conditions do not warrant an immediate application of the brakes. In other words, the control of the train is not taken entirely out of the hands of the engineer; but if he is incapacitated and unable to protect his train, an automatic brake application will occur.

My invention deals particularly with the brake controlling mechanism. Generally stated, I propose to give the automatic brake application by operating the usual engineer's brake valve which forms part of the regular air brake equipment for trains; and in accordance with my invention, I aim to provide automatic brake control mechanism, adapted to be controlled electrically, which will act to exert a pressure tending to operate the engineer's brake valve to a brake applying position and to continue this pressure for some selected interval of time, with the result that, unless the engineer takes hold of his brake valve handle and opposes such pressure, the brakes will be applied.

One object of my invention is to provide a pneumatic device for operating an engineer's brake valve which comprises a unitary structure readily attachable to the standard engineer's brake valve without any alteration in said brake valve.

A further object is to devise an operating mechanism for engineers' brake valves, which will not interfere in any way with the regular manual operation of such valves.

A still further object is to provide an operating mechanism which will automatically arrest the movement of the brake valve handle at the service position, thereby preventing it being accidentally thrown over to the emergency position, and which will do this without interfering with the manual operation of the valve to the emergency position, if required.

Other detail objects and advantages of my invention will be in part obvious and in part pointed out hereinafter, and the novel features are defined in the appended claims.

In describing the invention in detail, reference will be made to the accompanying drawings in which like reference characters designate corresponding parts in the several views, and in which:—

Figure 1 is a plan view of an engineer's brake valve with my improved operating mechanism applied thereto;

Fig. 2 is a fragmentary view showing a brake valve handle operated to the service position and illustrating the operation of the yielding stop for arresting it in that position;

Fig. 3 is an elevation of an engineer's brake valve and shows my improved operating mechanism in vertical section, said section being taken substantially on the line 3—3 in Fig. 1;

Fig. 4 is a fragmentary vertical section of the operating mechanism taken on the line 4—4 in Fig. 1;

Fig. 5 is a similar vertical section taken on the line 5—5 in Fig. 1;

Figure 6:
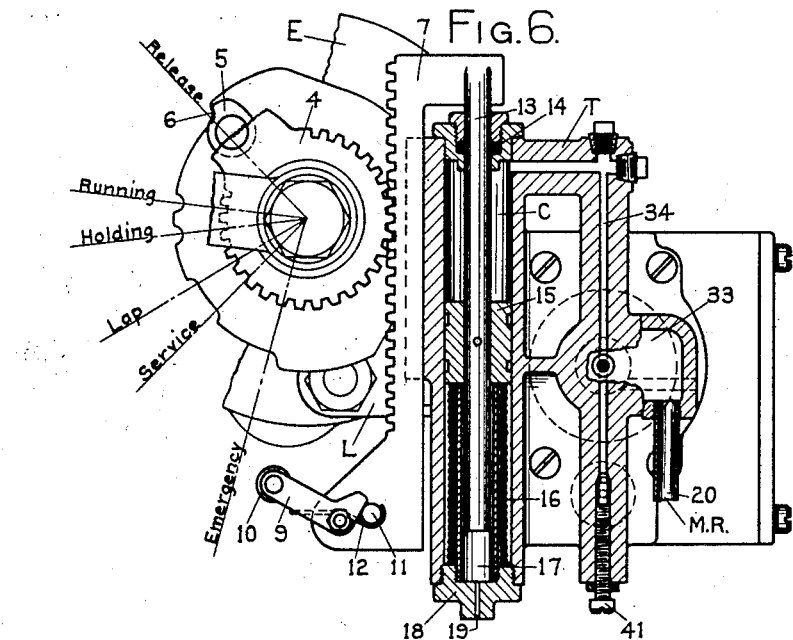
Fig. 6 is a horizontal section taken on the line 6—6 in Fig. 3.

The engineer's brake valve, being of well known construction, is shown in outline in a conventional manner and designated E. This valve is provided with the usual handle 1 and latch 2. Loosely mounted on the stem of the valve below the handle 1 is a mutilated gear 4 having a projecting portion, to the under face of which is fixed a cam 5 (see Fig. 6) having a curved face and shoulder 6, for the purpose hereinafter explained. The gear 4 turns loosely about the stem of the valve E and is operated by a rack 7 forming part of a unitary mechanism arranged to be fastened to the brake valve E. This unitary mechanism is supported and housed by a main casting A, and a top casting T attached thereto, suitably shaped and constructed, together with bottom and side covers. The main casting A is provided with a curved lug L fastened to the valve by the regular nuts used for holding the top of said valve in place, as shown in Figs. 1 and 2.

The rack bar 7 is guided in lugs 8 integral with the top casting T; and attached to this rack bar near one end is a yielding stop arm 9. This arm 9 has a roller 10 projecting down into the path of movement of the handle 1. This arm 9 may swing horizontally about a pin fixed in the rack bar 7, and is normally held with its tail piece against a stop pin 11 by the tension of a spring 12.

The rack bar 7 is integral with one end of a piston rod 13 (see Fig. 6), which passes through a stuffing box 14 into a bore in the top casting T constituting a cylinder C. An air-tight piston 15, with the usual air rings, is pinned to the rod 13 and is urged in one direction by a compression coil spring 16 surrounding a tube 17 attached to a removable plug 18, said plug having an exhaust passage 19 therein. Normally the spring 16 is compressed by air pressure on the opposite side of piston 15 which is supplied from some suitable source (not shown), as the main reservoir of the air brake equipment, this source being connected to pipe 20. The supply of pressure against piston 15 is controlled by an electro-pneumatic valve designated as a whole E. P. V.

This electro-pneumatic valve E. P. V., best shown in Figs. 4 and 5, comprises an iron clad magnet having a coil or winding 21, an armature 22, and a plunger 23 connected thereto. The upper end of the plunger 23 bears against a pair of valves 24 and 25 on a stem 26 guided in a plug 27. A spring 28 presses the valves 24 and 25 downward. Fastened to the lower end of the plunger 23 is an insulated contact disc 29 arranged to bridge contact springs 30—31 fastened to a panel 32 of insulating material. Normally the magnet winding 21 is energized, and its plunger 23 raised, so that the valve 24 is closed and the valve 25 open. Compressed air is then supplied to cylinder C from pipe 20 to the upper chamber 33 and through passage 34. When the magnet winding 21 is deenergized, the upper valve 25 closes, shutting off the supply of pressure, and the lower valve 24 opens, allowing the pressure in the cylinder to escape through the exhaust port 35.

In connection with the apparatus described I employ a time controlled device, illustrated as a pneumatically operated dash-pot. This dash-pot comprises an air-tight piston 36 in a cylinder 37 formed by a bore in the main casting A. The piston 36 is urged upward by a spring 38 bearing at its lower end against a plug 39 screwthreaded into said bore. The upper part of the cylinder 37 above the piston 36 is in communication with the passage 34 through passage 40 and past the pointed end of an adjustable screw 41, the pointed end of this screw and its cooperating seat constituting an adjustable restricted orifice. The piston rod 42, to which the piston 36 is connected, has a collar 43 fastened thereto near its lower end. The end of one arm of an angle lever 44 is forked and straddles the piston rod 42 above the collar 43, and the other arm of this angle lever carries an insulated roller 45 adapted to press a resilient contact spring 46 against a fixed contact 47, both supported by the insulated panel 32.

Figure 7:
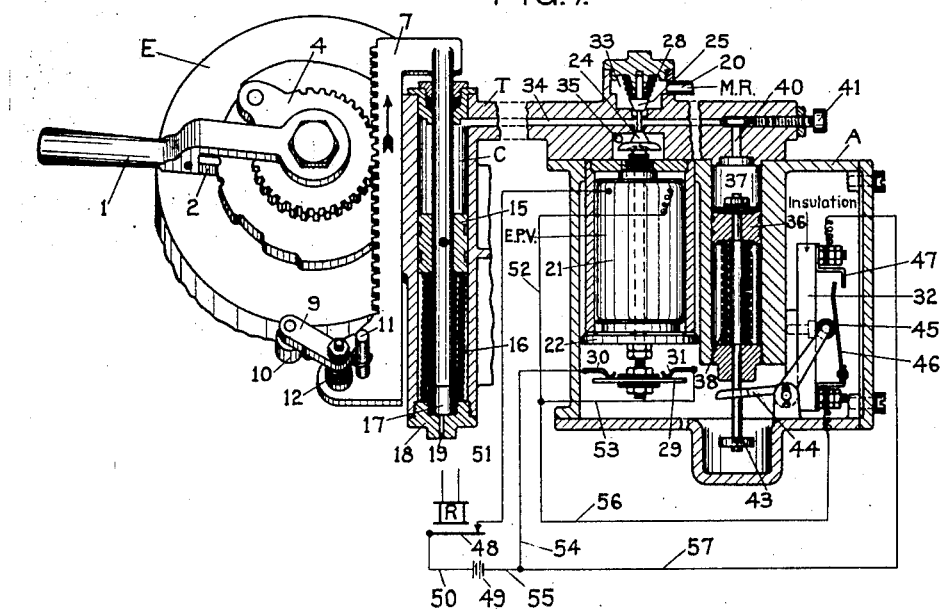
Fig. 7 is a diagrammatic view illustrating in a simplified manner the various operating parts and the electrical connections.

Fig. 7 illustrates the circuit connections. R designates a control relay which is governed by suitable means (not shown) so as to be normally energized to maintain its contacts 48 closed, and which is deenergized momentarily at each caution signal. The magnet winding 21 is normally energized from a suitable source of current on the car, as a battery 49, by a normally closed stick circuit, which may be traced as follows: commencing at battery 49, wire 50, contacts 48 of relay R, wire 51, magnet winding 21, wires 52 and 53, contact 31, disc 29, contacts 30, and wires 54 and 55 back to the battery. The stick contacts 30—31 are shunted when the contacts 46—47 are closed by the dash-pot, said shunt comprising wires 56, contacts 46—47 and wire 57.

Operation.—Normally the parts are in the position shown. The handle 1 may be moved by the engineer to any position without interference. When the control relay R is deenergized at a caution signal, the opening of its contacts 48 deenergizes magnet winding 21, thereby closing valve 25, opening valve 24, and opening the stick contacts 30—31. The opening of contacts 30—31 prevents re-energization of the magnet winding 21 when the contacts 48 of the control relay reclose, the contacts 46—47 being normally open. The closing of valve 25 cuts off the supply of pressure from the main reservoir to the cylinder C, and the opening of valve 24 exhausts the pressure in said cylinder, so that the piston 15 is forced outward by the spring 16, thereby moving the rack bar 7 in the direction indicated by the arrow, Fig. 7, and rotating gear 4 counter-clockwise. Assuming the brake valve handle 1 to be in the running position at this time, as shown in Fig. 1, the rounded portion of the cam 5 pushes the latch 2 out of its notch, and the shoulder 6 on this cam engages said latch and swings the brake valve lever 1 to the service position, as shown in Fig. 2. During this movement the rack bar 7 is moved to bring the roller 10 on the stop arm 9 into the position shown in Fig. 2, where it engages the handle 1 and limits its movement. In this way the brake valve is operated to the service position, unless the engineer takes hold of the handle 1 and prevents its movement. The tension of the spring 16 may be selected to give any desired degree of pressure, which the engineer is obliged to oppose, if he desires to prevent automatic brake application. I prefer to make the tension of the spring sufficient to overcome the friction of the parts, and to exert a pressure requiring enough effort on the part of the engineer in opposing such pressure as to bring the operation forcibly to his attention. The stop arm 9 arrests the movement of the handle 1 in the service position and enables a strong spring 16 to be used, without incurring the danger of the handle being carried by its inertia to the emergency position. Referring to Fig. 2, it will be noted that the stop arm 9 is so arranged that it does not positively lock the handle 1, and may be pushed aside (to the position shown in dotted lines) if it is desired to move the handle to the emergency position. In this connection it should be understood that the spring 12 is made strong enough to resist the impact of the arm 1 as it is operated by the spring 16, but is not so strong that it may not be readily overcome by the engineer. After the operation of the brake valve to the service position, as described, if the engineer desires to release the brakes, he must move the handle 1 against the opposition of the spring 16 in so doing.

Pressure against the brake valve handle 1 is maintained, after it has been operated, until after the lapse of a predetermined time, for example, two or three seconds. This timing and resetting operation is governed by the dash-pot device. At the same time that air is exhausted from the cylinder C, pressure is also exhausted from the cylinder 37 above the dash-pot piston 36, so that said piston may be forced upward by the spring 38. The adjustment of the screw 41 determines the rate at which this pressure is exhausted, and thus the time required for the piston 36 to assume its upper position. After this lapse of time, the collar 43 engages lever 44 and closes contacts 46—47, thereby establishing the pickup circuit for the magnet winding 21. This operates the valves 24 and 25 and restores the parts to normal.

Various details of the construction, such as the removable plugs and the various separable parts facilitating manufacture and assembly, have not been described, specifically, since they will be readily apparent from the drawing. The various joints subject to air pressure are provided with gaskets in the usual way. In practice, some of the wires shown in Fig. 7 are arranged in conduits attached to the boss 59 (see Fig. 4) and are led to binding posts on the insulated panel 32.

It will be noted that failures of the parts likely to occur in service are on the side of safety. The force for moving the brake valve handle is provided by a compression spring which is housed and protected against injury, and is also supported so that in practically all cases it would continue to function even though broken. A spring opposed by fluid pressure being used as the active operating agent, rather than fluid pressure, any failure of the source of pressure, breaking of pipes, or the like, results in a failure on the side of safety. The electro-pneumatic valve is controlled by a normally closed circuit, so that if the wires of this circuit become broken, or the battery fails, an unnecessary operation, but one on the side of safety, will result. In case of such failures, or other permanent derangement of the parts, the engineer may proceed by holding his brake handle against the spring tension; and in case of serious difficulty, such as the jamming or sticking of the parts, the gear 4 may be readily removed, after first taking off the handle 1, or, the plug 18 may be unscrewed and the spring 16 taken out, the brake valve in either case being then entirely free to be operated in any way desired, thereby permitting the train to be run in the usual way until suitable repairs can be made. It will be observed that the requisite venting of the train pipe to produce a service application of the brakes is obtained, according to my invention, by operation of the regular engineer's brake valve, and not by additional devices connected to the air brake system. Such auxiliary brake applying devices, unless so carefully constructed as to be complicated, are likely to be more a danger than a protection, since they are liable to interfere with the operation of the braking system and prevent the engineer stopping the train himself.

The brake application provided by my invention, being under the control of the engineer, may be entirely prevented, or increased, or graduated off, accordingly as conditions of speed, and the like, may make it expedient or desirable, the engineer being relied upon to control his train in the best way consistent with safety and facility, after having been forcibly reminded of the existence of danger ahead. If the engineer should be incapacitated, or for any other reason fails to observe the signal set against him, the automatic mechanism will operate to cause a service application of the brakes, which will stop the train, unless the engineer now aware of danger deliberately releases the brakes.

Obviously, various modifications and adaptations of the particular construction shown and described may be made without changing its operation, functions and advantages; and I desire to have it understood that this construction is merely illustrative of the idea of means underlying my invention and does not exhaust the various embodiments of my invention.

What I claim as new and desire to secure by Letters Patent of the United States, is:

1. In an automatic train control system, operating mechanism for engineers' brake valves comprising a gear loosely mounted on the stem of the valve, means carried by said gear for releasing the latch of the valve and operating the handle to a brake applying position, and means adapted to be controlled electrically for rotating said gear.

2. In an automatic train control system, operating mechanism for engineers' brake valves comprising a gear loosely mounted on the stem of the valve and having a cam projection arranged to release the latch of the valve handle and to move the handle to the service position, a rack meshing with said gear and biased to rotate it in one direction and operate said valve, and fluid pressure means adapted to be controlled electrically for normally overcoming the biasing force acting on said rack.

3. In an automatic train control system, operating mechanism for engineers' brake valves comprising normally inactive means for releasing the latch of the valve handle and for shifting the handle to the service position, said means after being set into operation continuing until restored, and a time controlled device operated simultaneously with said means for causing restoration thereof after a predetermined time.

4. In an automatic train control system, operating mechanism for engineers' brake valves comprising means for exerting a pressure tending to operate the handle of said valve toward the service position, and means for yieldingly arresting the movement of the handle in the service position while permitting manual movement thereof to the emergency position.

5. In an automatic train control system, operating mechanism for engineers' brake valves comprising a gear loosely mounted on the stem of the valve and having a cam projection arranged to release the latch of the valve handle and to move the handle to the service position, a rack meshing with said gear, a yieldable stop carried by said rack and adapted to arrest the movement of the handle in the service position when said rack is operated, a spring for moving said rack in one direction, and electrically controlled fluid pressure means for normally opposing the tension of said spring.

6. In an automatic train control system, operating mechanism for engineers' brake valves comprising spring operated means for operating said valve to a brake applying position, fluid pressure means for preventing movement of said spring operated means, an electro-pneumatic valve for controlling said fluid pressure means and having a normally closed stick circuit, time controlled means governed by said valve, and a pickup circuit for said valve controlled by said time controlled means.

7. In an automatic train control system, the combination with an engineer's brake valve, of normally inactive mechanism for operating said valve to the service position, said mechanism while inactive permitting manual movement of the valve to any position without interference and when operated acting to exert a pressure tending to move the handle to the service position, and time controlled means for governing the restoration of said mechanism to its normal condition.

8. In an automatic train control system, the combination with an engineer's brake valve, of means for actuating said valve to a brake applying position, said means including a spring for causing such operation, and power operated means for maintaining said first mentioned means inactive.

9. In an automatic train control system, the combination with an engineer's brake valve, of power operated mechanism including means for actuating said valve toward its service position, means for arresting the operation of the valve in the service position, and means for rendering said first mentioned means effective for a predetermined time.

10. In an automatic train control system, operating mechanism for an engineer's brake valve comprising means tending to exert the yieldable pressure effective to release the latch of the valve handle and thereafter operate the valve to the service position, and electrically controlled means for normally preventing operation of said means.

11. In an automatic train control system, operating mechanism for an engineer's brake valve comprising spring operated means for releasing the latch of the valve handle and for then shifting the valve to its service position, and electrically controlled fluid pressure means for normally preventing the action of said spring operated means.

12. In an automatic train control system, operating mechanism for an engineer's brake valve comprising an air cylinder, a piston, a spring in the cylinder acting on the piston, means operatively connected to the piston and acting when it is moved by the spring to release the latch of the valve handle and then shift the valve to the service position, and electrically controlled means for normally supplying pressure to the cylinder to maintain the spring compressed.

13. In an automatic train control system, operating mechanism for an engineer's brake valve comprising means operable to release the latch of the valve handle and then shift the valve to the service position, and means for arresting the movement of the valve in the service position without preventing manual movement thereof to the emergency position.

14. In an automatic train control system, operating mechanism for an engineer's brake valve comprising pressure operated means for releasing the latch of the valve handle by a preliminary movement and for thereafter shifting the valve to the service position, and means rendered effective by the operation of said means for arresting the movement of the valve in the service position without preventing manual movement thereof to the emergency position.

15. In an automatic train control system, operating mechanism for an engineer's brake valve comprising fluid pressure operated means rendered active by the exhaustion of pressure for releasing the latch of the valve handle and shifting the valve to the service position, an electro-pneumatic valve with contacts operated thereby in its energizing circuit for controlling the supply of pressure to certain means, and time controlled means for automatically reenergizing said electro-pneumatic valve.

16. In an automatic train control system, operating mechanism for an engineer's brake valve comprising a main casing adapted to be attached to the engineer's valve, a gear loosely mounted on the valve stem and provided with means to release the latch of the valve handle and thereafter move the valve toward its service position, and electrically controlled fluid pressure means operable upon release of pressure for actuating said gear.

17. In an automatic train control system, operating mechanism for an engineer's brake valve comprising means for moving the valve toward its service position, and means rendered active upon operation of said means for yieldingly arresting the movement of the valve in the service position while permitting manual movement thereof to the emergency position.

18. In an automatic train control system, operating mechanism for an engineer's brake valve adapted to be attached to the casing of said valve and comprising spring operated means for shifting the valve to a brake applying position, fluid pressure means for normally maintaining said means inactive, and an electro-pneumatic valve for controlling the supply of pressure to said fluid pressure means.

19. In an automatic train control system, the combination of the usual engineer's brake valve, of power operated automatic means for operating said valve to a brake applying position, said means having a casing superimposed on and wholly supported by two bolts of the casing of said brake valve.

20. In an automatic train control system, the combination of the usual engineer's brake valve, of a fluid pressure device for actuating said valve to a brake applying position, and an electro-responsive device for controlling said pressure device, said pressure device and electro-responsive device being wholly supported by the casing of said brake valve.

21. In an automatic train control system, the combination of the usual engineer's brake valve, of means tending to move said valve to a brake applying position and including a spring for causing such movement, and fluid pressure operated means for at times preventing such movement, both of said means being wholly supported by said brake valve.

22. In an automatic train control system, the combination of the usual engineer's brake valve, of a gear loosely mounted on the stem of said valve and having means arranged to engage the valve handle, and a power operated rack in continuous operative engagement with said gear.

23. In an automatic train control system, the combination of the usual engineer's brake valve, of automatic means for actuating said valve to the service brake applying position, and a disengageable stop member for preventing said automatic means from actuating said valve beyond said service position, said member being ineffective while the automatic means is inactive and permitting manual movement of the valve to the emergency position.

24. In an automatic train control system, operating mechanism for engineers' brake valves comprising means tending to actuate said brake valve to a brake applying position, and controllable means normally connected to a source of energy supply for preventing said means from actuating the brake valve, said controllable means if momentarily cut off from said source being automatically cut off until reset.

25. In an automatic train control system, operating mechanism for engineers' brake valves comprising means tending to actuate said brake valve to a brake applying position, and means normally connected to a source of energy supply for preventing said means from actuating the brake valve, said means if momentarily cut off from said source being automatically cut off for a predetermined period of time.

26. In an automatic train control system, a unitary operating mechanism for engineers' brake valves attached directly to the usual engineer's brake valve and comprising, a fluid pressure operating means, an electrically operated pneumatic valve for controlling said operating means, an energizing circuit for said valve connected through a contact maintained closed by said valve only while said valve is in its energizing position, and automatic means for re-energizing said valve after a predetermined time following its operation.

27. In a train control system, the combination with operating mechanism for engineers' brake valves adapted when actuated to automatically shift the brake valve to a brake applying position, an electro-responsive device normally energized by a stick circuit through its own contacts for governing said mechanism and for causing actuation thereof whenever deenergized, a pick-up circuit for the electro-responsive device, and automatic means governed by said device for closing the pick-up circuit after the lapse of a predetermined time following the deenergization of the electro-responsive device.

28. A unitary device adapted to be connected to and wholly supported by the usual engineer's brake valve for actuating said valve comprising, movable means for moving said brake valve to the brake applying position when initiated, and means for returning said movable means to its initial position after the lapse of a predetermined time.

29. Brake applying apparatus for train control systems comprising, in combination with the engineer's brake valve of the usual air brake system, operating mechanism movable independently of the engineer's valve and normally in an inactive position not interfering with the movement of the engineer's valve to any one of its positions, said operating mechanism when actuated from its initial inactive position exerting a tendency to shift the engineer's valve to a brake applying position, control means for said operating mechanism, and automatic time controlled means concurrently initiated with the actuation of said mechanism for governing the control means after the lapse of a predetermined interval of time to then cause restoration of said mechanism to its initial position.

30. Automatic brake control apparatus for train control systems comprising, in combination with the usual engineer's brake valve of air brake systems, normally inactive power operated mechanism operable to exert a tendency to shift the engineer's valve to a brake applying position, said mechanism while in its inactive position permitting free movement of the engineer's valve without interference to any one of its positions, and electro-responsive means normally energized by a stick circuit including its own contacts for governing said mechanism and adapted when deenergized to cause operation thereof.

31. Brake control apparatus for train control systems comprising, in combination with the usual engineer's brake valve of an air brake system, power operated mechanism for shifting the brake valve to a brake applying position, electrically operable control means for governing the operation of said mechanism and adapted when rendered active to continue active until restored, and time controlled circuit controlling means concurrently initiated with the operation of said mechanism for determining the restoration of said control means.

32. Brake control apparatus for train control systems comprising, in combination with the usual engineer's brake valve of an air brake system, pneumatically governed mechanism for shifting the engineer's brake valve to a brake applying position, and automatic means for causing restoration of said mechanism to its initial position comprising, a pneumatically operated dash-pot device.

33. Brake control apparatus for train control systems comprising, in combination with the usual engineer's brake valve of an air brake system, operating mechanism responsive to air pressure for shifting the brake valve to a brake applying position, a normally energized electro-pneumatic valve adapted when deenergized to render said operating mechanism effective, contacts operated by said electro-pneumatic valve and closed only while it is energized, a stick circuit including said contacts for energizing said valve, automatic means for breaking the stick circuit, a pick-up circuit for said valve, and time controlled means initiated concurrently with the deenergization of said valve for closing its pick-up circuit after a predetermined interval of time.

34. Brake control apparatus for train control systems comprising, in combination with the usual engineer's brake valve of an air brake system, a gear loose on the stem of the valve and provided with means adapted to engage the handle of the valve and move it to a brake applying position, a rack meshing said gear, a casting wholly supported by the valve casing and provided with a cylinder, a piston having an air-tight fit in said cylinder and connected to the rack, a relatively long spring in the cylinder bearing against one side of the piston, a source of fluid pressure, and electrically controllable means for supplying the pressure from said source to the other side of the piston, thereby compressing said spring and moving the gear into position where it does not interfere with movement of the engineer's valve to any of its positions.

MAURICE F. GEER.